United States Patent [19]

Kormanyos

[11] Patent Number: 5,746,799
[45] Date of Patent: May 5, 1998

[54] PROCESS FOR HEATING GLASS SHEETS WITHIN A FORCED CONVECTION HEATING APPARATUS BY MIXING AND DISTRIBUTING SPENT WORKING FLUID AND COMBUSTION GASES

[75] Inventor: Kenneth R. Kormanyos, Sylvania, Ohio

[73] Assignee: Gas Research Institute, Chicago, Ill.

[21] Appl. No.: 769,765

[22] Filed: Dec. 19, 1996

Related U.S. Application Data

[62] Division of Ser. No. 262,310, Jun. 20, 1994, abandoned.

[51] Int. Cl.⁶ .................................................. C03B 25/08
[52] U.S. Cl. ................................. 65/111; 65/104; 65/119
[58] Field of Search ............................. 65/104, 106, 107, 65/111, 119, 120

[56] References Cited

U.S. PATENT DOCUMENTS

| | | | |
|---|---|---|---|
| 3,048,383 | 8/1962 | Champlin | 65/182.2 X |
| 3,508,899 | 4/1970 | Ward | 65/119 |
| 3,637,362 | 1/1972 | Oelke et al. | 65/25.2 |
| 4,047,919 | 9/1977 | Oelke et al. | 65/273 |
| 4,144,045 | 3/1979 | Starr | 65/107 |
| 4,738,705 | 4/1988 | McMaster | 65/119 |
| 4,755,204 | 7/1988 | Boardman et al. | 65/107 |
| 4,764,196 | 8/1988 | Boutier et al. | 65/106 |
| 4,802,904 | 2/1989 | Boutier et al. | 65/106 |
| 4,853,019 | 8/1989 | Blank et al. | 65/106 |
| 4,904,533 | 2/1990 | McMaster | 428/426 |
| 5,078,775 | 1/1992 | Maltby, Jr. et al. | 65/182.2 |
| 5,079,931 | 1/1992 | Lehto et al. | 65/288 |
| 5,094,678 | 3/1992 | Kramer et al. | 65/104 |
| 5,110,338 | 5/1992 | McMaster | 65/182.2 |
| 5,150,534 | 9/1992 | Kramer | 34/155 |
| 5,209,767 | 5/1993 | Maltby, Jr. et al. | 65/182.2 |

FOREIGN PATENT DOCUMENTS 40 10 280 A1   10/1991   Germany ................. F26B 13/02

OTHER PUBLICATIONS

"Convective Heating of Flat Glass In Thermal Loading/Tempering Installations—Advantages and Possibilities", Carl Kramer and Guido Becker, Presented at GLASTECH 92, Schleden, Germany (no month available).

Article entitled, "Horizontal Toughening Design Features Convective Heating", report by Carl Kramer and Guido Becker, published in *Glass International*, Sep. 1993 issue.

*Primary Examiner*—Donald E. Czaja
*Assistant Examiner*—Sean Vincent
*Attorney, Agent, or Firm*—Dick and Harris

[57] ABSTRACT

A forced convection heating apparatus and process for heating glass sheets therewithin. The apparatus includes at least one gas burner for producing hot combustion gases which is to be distributed to the top and/or bottom surfaces of a glass sheet within the apparatus housing. Spent hot working fluid, which has impinged the top and bottom surfaces of the glass sheet, is drawn into a mixing chamber operably positioned about a gas burner. The spent hot working fluid and newly produced hot combustion gases from the gas burner are mixed within the mixing chamber and then distributed toward and into operable contact with at least one of the top and bottom surfaces of the glass sheet.

6 Claims, 5 Drawing Sheets

PROCESS FOR HEATING GLASS SHEETS WITHIN A FORCED CONVECTION HEATING APPARATUS BY MIXING AND DISTRIBUTING SPENT WORKING FLUID AND COMBUSTION GASES

This application is a division of application Ser. No. 08/262,310, filed 20 Jun. 1994, now abandoned.

BACKGROUND OF THE INVENTION

1. Field of the Invention

The present invention relates generally to apparatuses and processes associated with the heating of glass sheets, and, more particularly, to a forced convection heating apparatus and process for heating glass sheets therewithin.

2. Statement of the Prior Art

Heating of glass sheets within a furnace, and, more particularly, in a gas-fired forced convection furnace, has been known in the art for several years. Indeed, one such type of prior art gas-fired furnace conveys a sheet of glass through the furnace on a bed of air. As the glass "floats" through the furnace, hot air is distributed toward and into contact with the top and bottom surfaces of the glass sheet. However, due to the complexity of a "floating" system, prior art devices of this type typically utilize convective heat flow to the bottom surface of the glass sheet, and radiant heat flow to the top surface of the glass sheet.

After the convective heat has impinged the bottom surface of the glass sheet, a portion of the "spent" heat/fluid is randomly returned back toward a proximally positioned gas burner where the spent fluid and newly produced convective heat/fluid are mixed and then recirculated toward impingement of same on the glass sheet.

Furthermore, prior art gas-fired heating devices have also been used which heat that is to impinge upon the top surface of a glass sheet is distributed from one or more gas burners located above the glass sheet as it passes through the device, and, convective heat that impinges the bottom surface of the glass sheet is distributed by one or more gas burners located below the glass sheet.

Although such prior art devices have indeed disclosed recirculation of spent hot working fluid and use of gas-fired burners, none of such prior art devices disclose, much less suggests, drawing spent hot working fluid toward and into a mixing chamber operably and closely positioned about a substantial portion of a gas burner—in which the gas burner is specifically intended to produce, for distribution, hot combustion gases to the respective top and/or bottom surfaces of the glass sheet being heated.

In addition, none of such prior art devices disclose, much less suggests, the use of gas-fired burners operably positioned above and below the glass sheet for producing and, in turn, distributing, forced convective flow of the hot combustion gases to corresponding ones of the top and bottom surfaces of the glass sheet in which: (1) the temperature of the hot combustion gases from each of the gas burner/mixing chambers can be controlled independently of each other; and/or (2) the impingement velocity of the hot combustion gases being distributed onto the top and bottom surfaces of the glass sheet can be independently controlled—toward uniform control of convection heat transfer to the top and bottom surfaces of the glass sheet, to, in turn, compensate for glass thickness, coating and color, among other variables.

These and other features of the present invention will become apparent because of the present Specification, claims and Drawings.

SUMMARY OF THE INVENTION

The present invention comprises a forced convention heating apparatus for heating glass sheets, in which the glass sheets each have a top surface and a bottom surface. The apparatus comprises a housing having an interior region, and means for conveying a glass sheet through the interior region. Gas burner means are operably associated with the housing for producing hot combustion gases.

A mixing chamber is operably positioned about at least a portion of the gas burner means. The mixing chamber has a proximal end operably associated with the first and second distributing means, and a second open end distally spaced from the proximal end. Directing means are used for directing spent hot working fluid, which has impinged upon at least one of the top and bottom surfaces of the glass sheet, toward and into the mixing chamber for operable mixing of at least a portion of the spent hot working fluid with newly produced hot combustion gases from the gas burner means toward transfer of same into at least one of the first and second distributing means.

The apparatus further comprises first means for distributing, and, in turn, impinging, a portion of the hot combustion gases, being produced from the gas burner means, to the bottom surface of the glass sheet within the interior region of the housing. In addition, a second means for distributing, and, in turn, impinging, at least a portion of the hot combustion gases from the gas burner/mixing chamber means to the top surface of the glass sheet is also used.

In the preferred embodiment of the invention, the gas burner/mixing chamber means produces the hot combustion gases at a predetermined temperature. In such an embodiment, the forced convection heating apparatus comprises first means for adjusting the temperature of the hot combustion gases prior to impingement of same on the bottom surface of the glass sheet, and second means for adjusting the temperature of the mixed hot combustion gases prior to impingement of same on the top surface of the glass sheet. The first and second temperature adjusting means are both operable, and, in turn, adjustable, independently of each other.

Also, in the preferred embodiment of the invention, the forced convection heating apparatus further comprises: first means for controlling impingement velocity of the hot combustion gases toward and onto the top surface of the glass sheet within the interior region of the housing; and, second means for controlling impingement velocity of the hot combustion gases toward and onto the top surface of the glass sheet within the interior region of the housing. The first and second impingement velocity control means being operable, and, in turn, controllable, independently of each other.

The forced convection heating apparatus further comprises means for causing a mixture of the spent hot working fluid and the newly produced hot combustion gases within the mixing chamber. The mixing means comprises a plurality of apertures that are integrally formed in the gas burner means for release of the hot combustion gases in a direction substantially perpendicular to the longitudinal axis of the gas burner means. The spent hot working fluid is operably sucked into the mixing chamber in a direction substantially perpendicular to the newly produced hot combustion gases as they are being operably released from the gas burner means, to, in turn, result in a mixing of the spent working fluid and newly produced hot combustion gases.

In the preferred embodiment of the invention, the directing means includes at least one fan operably associated with the mixing chamber for sucking at least a portion of the spent hot working fluid, which has impinged upon at least one of the top and bottom surfaces of the glass sheet within the interior region of the housing, toward and into the mixing chamber. Furthermore, the first and second distributing means each include at least one fan and at least one combustion air conduit member operably associated with a corresponding fan. Each of the combustion air conduit members have at least one nozzle member, or jet (although a plurality, or array, of such nozzles are preferred) operably positioned adjacent a corresponding one of the top and bottom surfaces of the glass sheet within the interior region of the housing for operably distributing, and, in turn, impinging at least a portion of the hot combustion gases toward and onto the adjacent top and bottom surfaces of the glass sheet.

The preferred embodiment of the invention further includes the process of heating a sheet of glass in a forced convection heating apparatus, in which the apparatus includes a housing having an interior region and the glass sheet has a top and bottom surface.

The process comprises the steps of: (a) inserting a glass sheet into the interior region of the housing; (b) producing hot combustion gases from at least one gas burner/mixing chamber; (c) distributing the hot combustion gases from at least one gas burner, toward and into operable contact with at least one of the top and bottom surfaces of the glass sheet within the interior region of the housing; (d) sucking at least a portion of spent hot working fluid that has operably contacted at least one of the top and bottom surfaces of the glass sheet toward and into a mixing chamber operably associated with a corresponding one of the gas burners, in which each of the mixing chambers is operably positioned about at least a portion of a corresponding one of the gas burners; (e) mixing the spent hot working fluid in the mixing chamber with the hot combustion gases being produced in the corresponding one of the at least one gas burner; and (f) distributing the mixed spent hot working fluid and the newly produced hot combustion gases, toward and into operable contact with at least one of the top and bottom surfaces of the glass sheet.

In this preferred embodiment, the process of heating a sheet of glass in a forced convection heating apparatus further comprises the step of controlling impingement velocity of the newly produced hot combustion gases from the mixing chamber toward and into contact with at least one of the top and bottom surfaces of the glass sheet. Such a controlling of the impingement velocity of the mixed fluids into contact with the top and bottom surfaces, respectively, of the glass sheet, being controllable independently of each other.

In another preferred embodiment, the process for heating a sheet of glass in a forced convection heating apparatus further comprises the steps of: (a) adjusting the temperature of the mixed spent hot working fluid and newly produced hot combustion gases from the mixing chamber that is to come into contact with the bottom surface of the glass sheet; and (b) adjusting the temperature of the mixed spent hot working fluid and newly produced hot combustion gases from the mixing chamber that is to come into contact with the top surface of the glass sheet. The adjusting of the temperature of the mixed fluids which are to come into contact with the top and bottom surfaces, respectively, of the glass sheet, being adjustable independently of each other, to, in turn, enable independent control of convection heat transfer to both surfaces of the glass sheet.

DETAILED DESCRIPTION OF THE DRAWINGS

Figure 1:
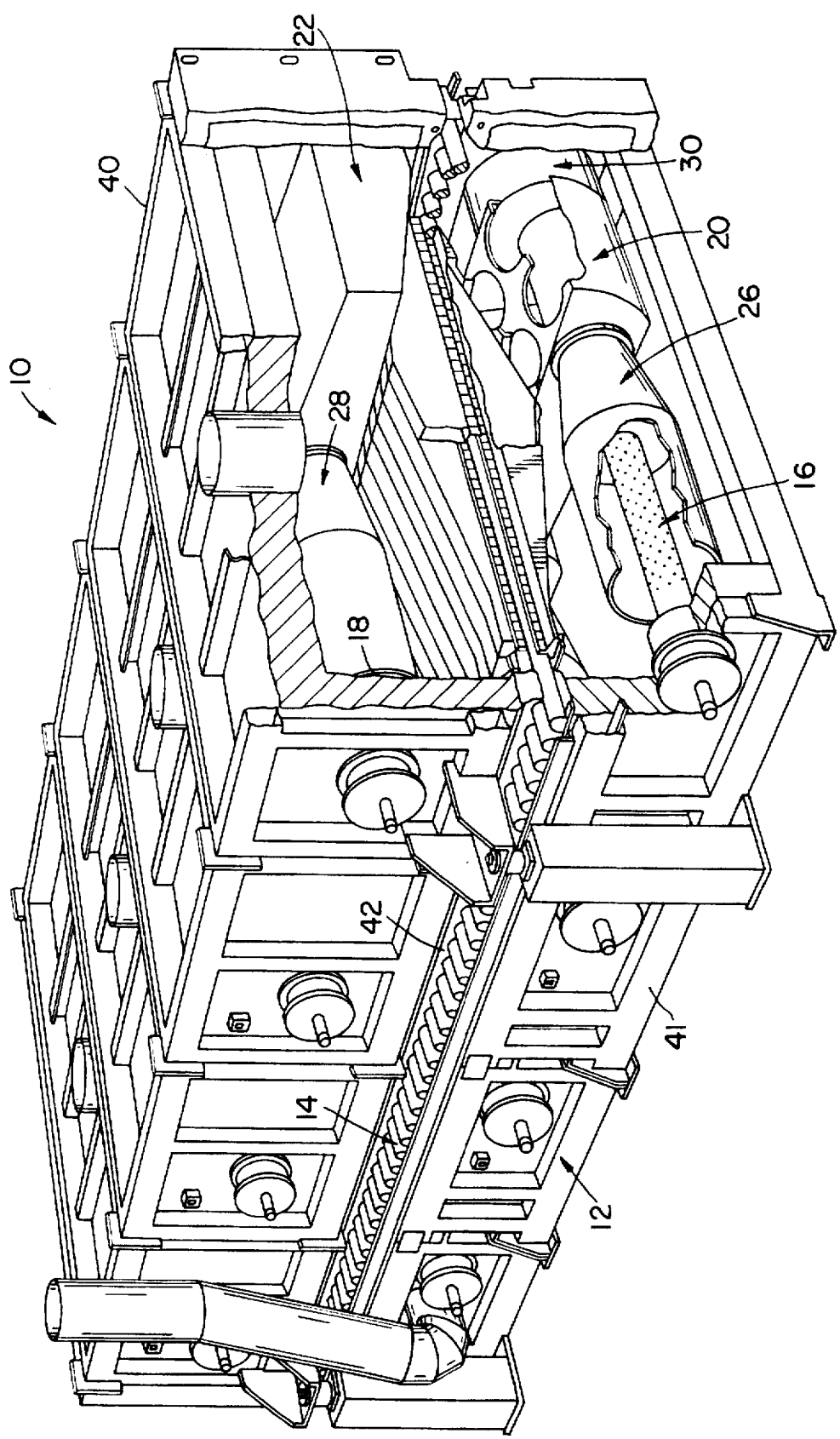
FIG. 1 of the drawings is a perspective view of the forced convection heating apparatus in partial cross-section and in partial break-away.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

At the outset, although it is contemplated that forced convection heating apparatus 10 (FIG. 1) be constructed with multiple gas burners, related distribution and recirculating assemblies/units, only two of such assemblies/units will be explained in detail—inasmuch as any additional units would comprise substantially the same components and intercooperation therebetween.

Figure 3:
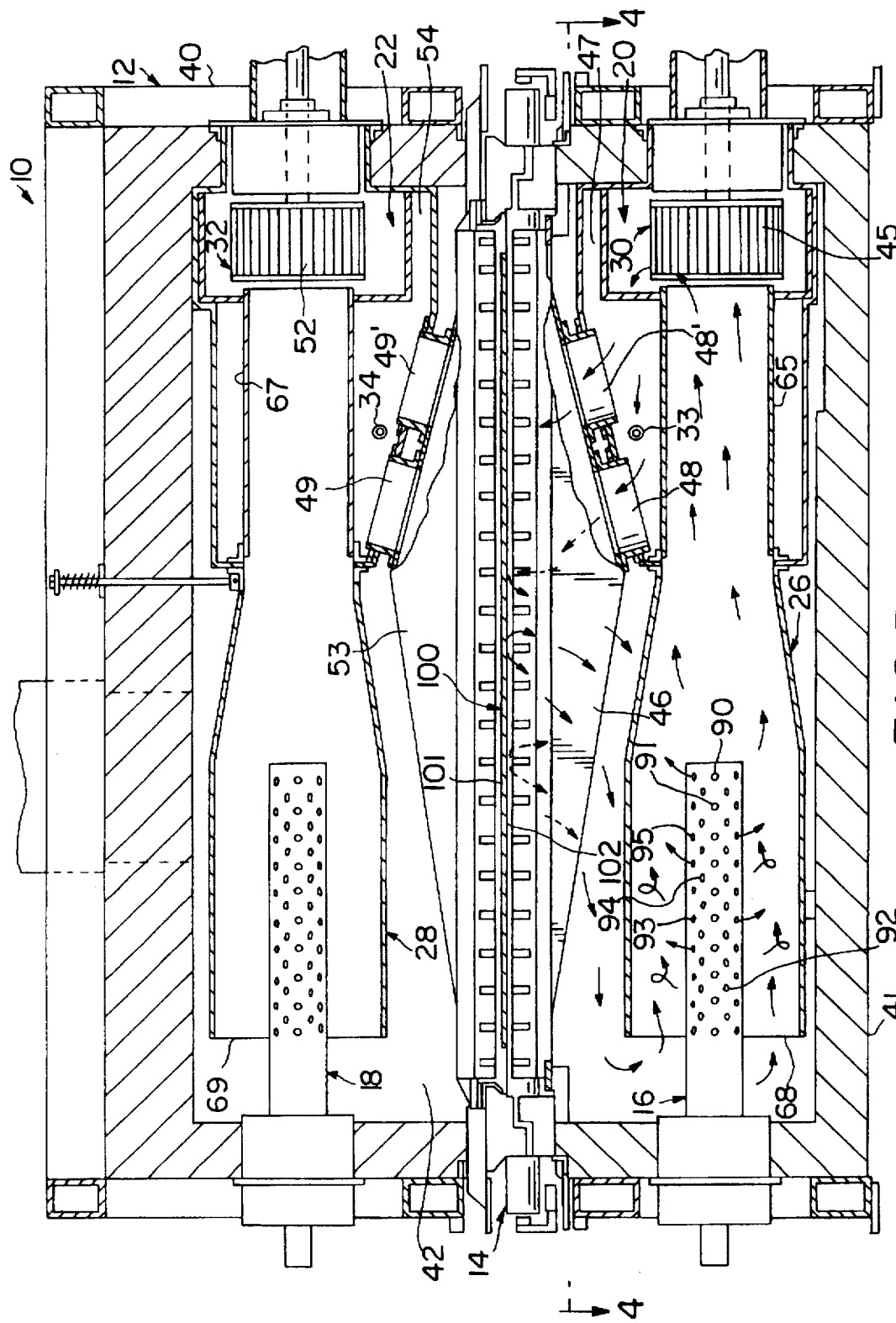
FIG. 3 of the drawings is a cross-sectional view of the forced convection heating apparatus taken generally along lines 3—3 of FIG. 2.

Forced convection heating apparatus 10 is shown in FIG. 1 and FIG. 3 as comprising housing 12, conveying means 14, first gas burner means 16, second gas burner means 18, first distributing means 20, second distributing means 22, first mixing chamber 26, second mixing chamber 28, first directing means 30, second directing means 32 (FIG. 3), first temperature adjusting means 33 (FIG. 3), second temperature adjusting means 34 (FIG. 3), mixture means 36 (FIG. 3) and first and second impingement velocity control means.

Figure 2:
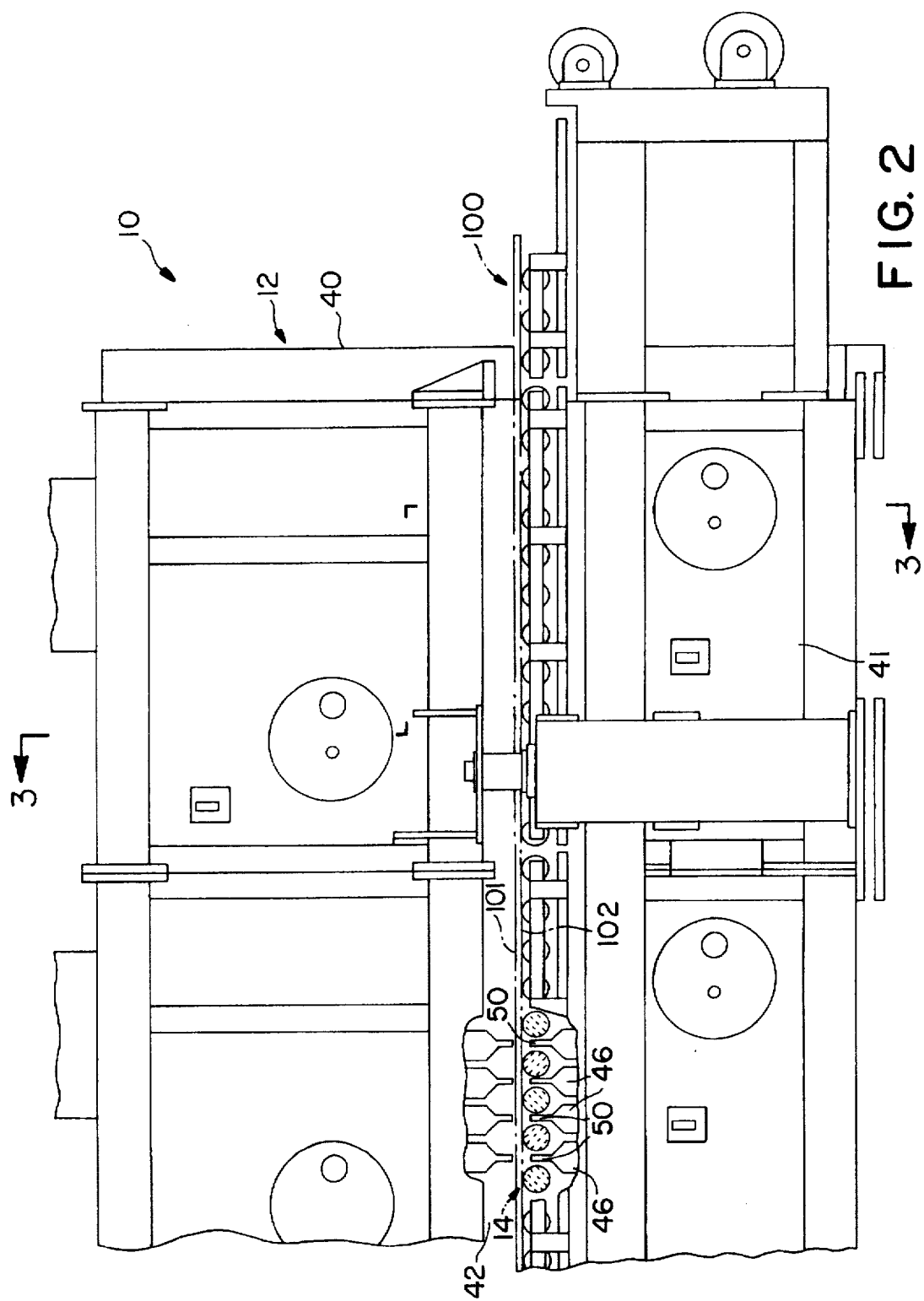
FIG. 2 of the drawings is a side cut-away view of the forced convection heating apparatus.

Housing 12, as shown in FIGS. 1–3, includes upper section 40, lower section 41, and interior region 42. Conveying means 14, which may comprise a plurality of ceramic rollers, are operably positioned between the upper and lower sections of housing 12, and are used to convey a glass sheet, such as glass sheet 100 (FIG. 2 and FIG. 3) through interior region 42 of housing 12. Glass sheet 100 includes top surface 101 and bottom surface 102. As can be seen in FIG. 2 and FIG. 3, when glass sheet 100 is operably positioned within interior region 42 of housing 12, top surface 101 will be operably exposed to upper section 40 of housing and bottom surface 102 will be operably exposed adjacent lower section 41 of housing 12.

First distributing means 20 is shown in FIG. 3 as comprising fan 45, working fluid conduit 46, and plenum member 47. Working fluid conduit 46 includes a plurality of male insert members, such as male insert member 48, 48' (FIG. 3) which are operably seated within corresponding receptacles, such as receptacles 80, 80' (FIG. 4) of the corresponding plenum member 47 (FIG. 4), and a plurality of nozzles, or jets, 50 (FIG. 5). As will be explained in greater detail, nozzles 50 comprise a plurality of apertures, such as apertures 70–72 (FIG. 5), for operable release of hot working fluid, toward and into contact with bottom surface 102 of glass sheet 100.

Second distributing means 22 is also shown in FIG. 3 as including fan 52, working fluid conduit 53, and plenum member 54. Working fluid conduit 53 of the second distributing means also includes a plurality of male insert members 49, 49' (FIG. 3) for operable insertion into corresponding receptacles (not shown) of plenum member 54, and nozzles 56 (FIG. 5). These nozzles, like nozzles 50 of first distributing means 20, enable hot combustion gases produced from a corresponding gas burner means 18 (FIG. 3) to be released toward and into operable contact with top surface 101 of glass sheet 100.

Figure 4:
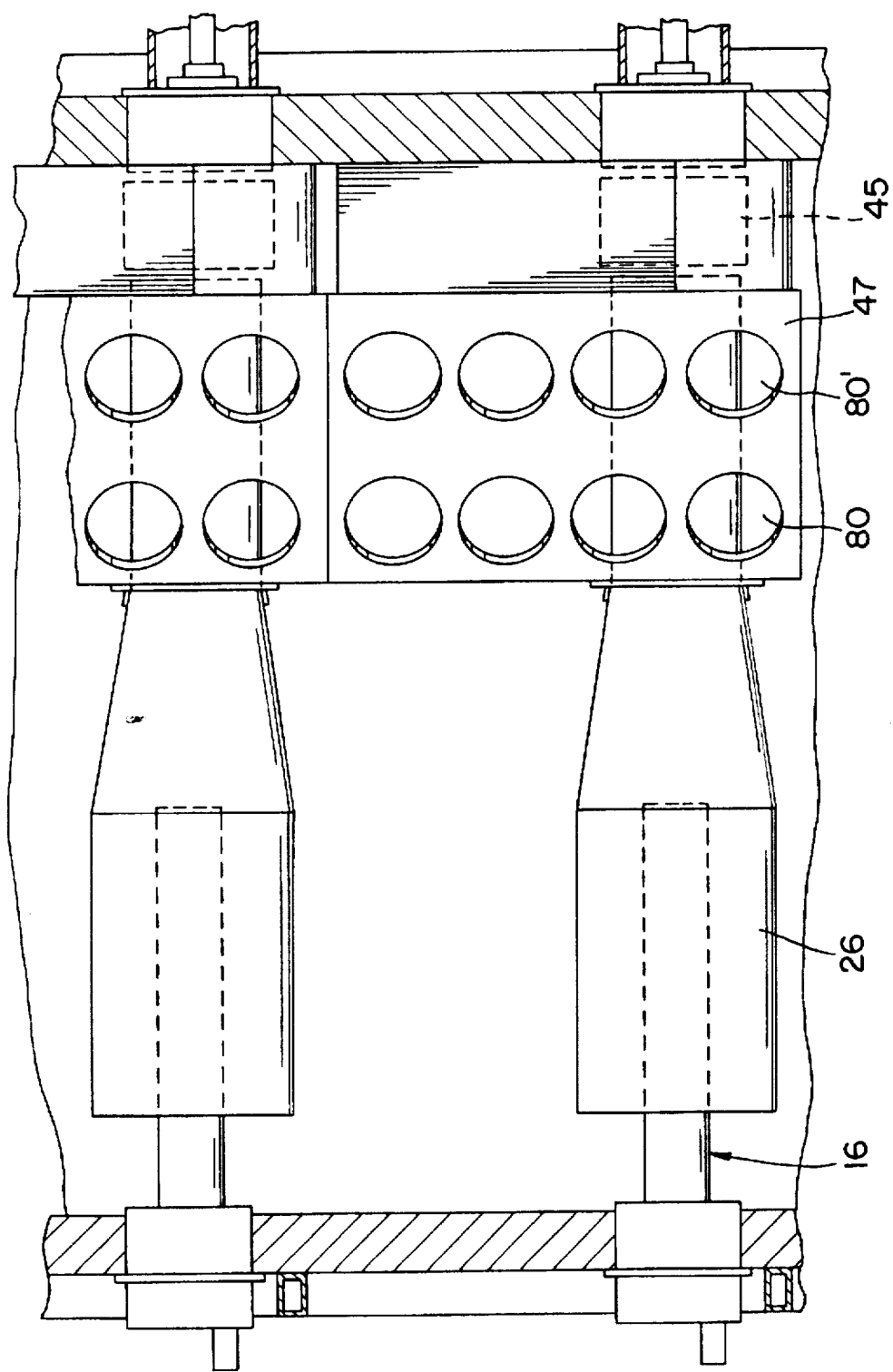
FIG. 4 of the drawings is a cross-sectional view of the forced convection heating apparatus taken generally along lines 4—4 of FIG. 3.
Figure 5:
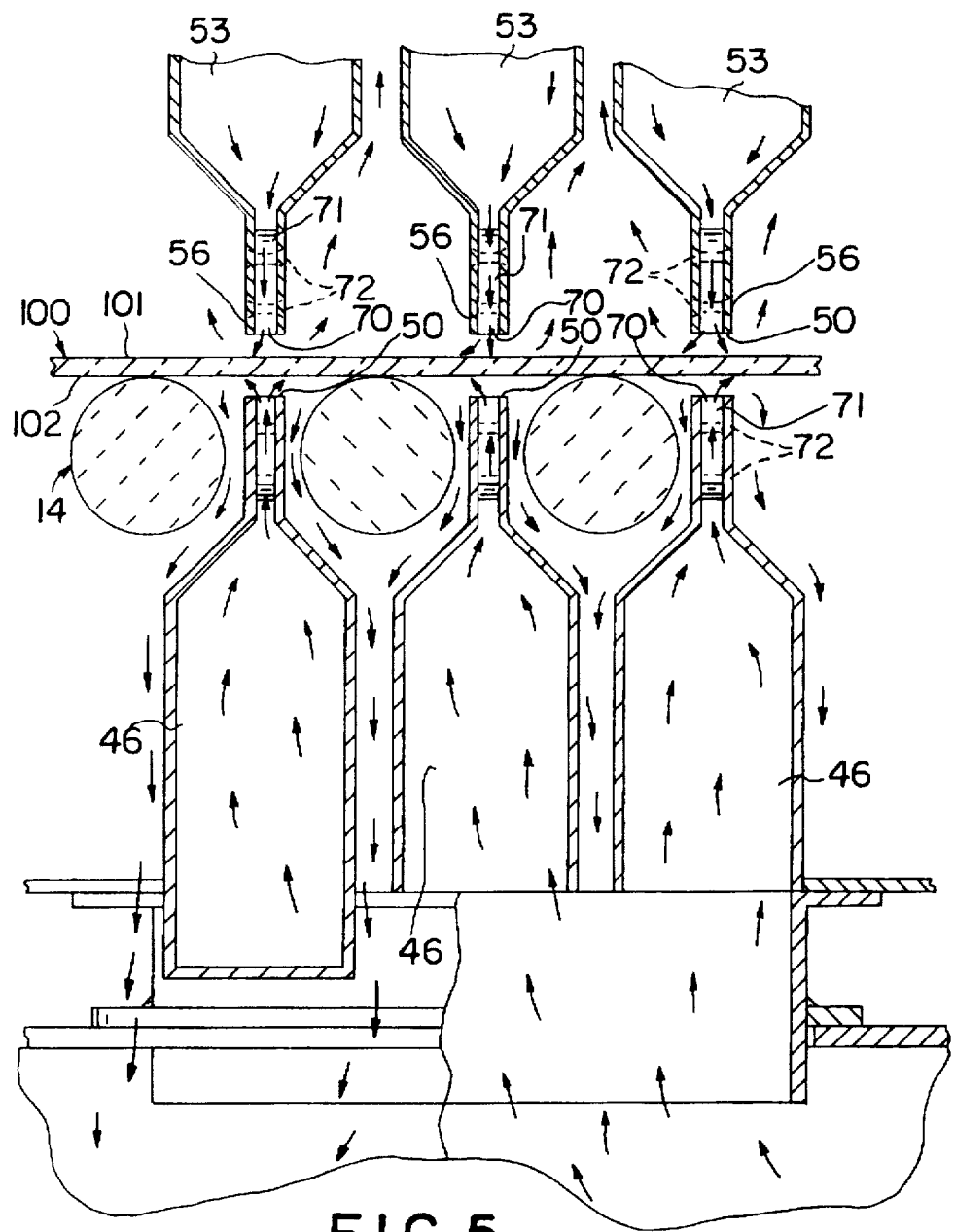
FIG. 5 of the drawings is a cross-sectional view of an array of the first and second distributing means, showing, in particular, distribution of hot combustion gases out of the corresponding nozzles, and, accordingly toward and into contact with the top and bottom surfaces of a glass sheet within the interior region of the housing of the forced convection heating apparatus.
Figure 6:
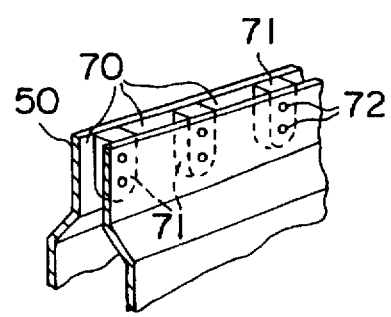
FIG. 6 of the drawings is a perspective view of the nozzles.

First mixing chamber 26 and second mixing chamber 28 are shown in FIG. 3 and FIG. 4. As can be seen, first mixing chamber 26 is operably positioned about a portion of first gas burner means 16, and second mixing chamber 28 is operably positioned about a portion of second gas burner means 18. Both the first and second mixing chambers 26 and 28, respectively, include a proximal end 65 and 67, respectively, and an open end 68 and 69, respectively—in which the proximal ends are operably positioned adjacent a corresponding fan, such as fans 45 and 52 (FIG. 3).

The fans, such as fans 45 and 52, which, among other things, serve to distribute hot combustion gases from the respective gas burner means toward and into eventual contact with the glass sheet, also serve as part of the directing means for sucking spent hot working fluid which has impinged on the top and bottom surfaces 101 and 102, respectively, of glass sheet 100, toward and into a corresponding one of the first and second mixing chambers 26 and 28, respectively (as shown by the direction of the arrows in FIG. 3). Although first and second directing means 30 and 32, respectively, each use fans 45 and 52, respectively, for sucking spent hot working fluid into a corresponding mixing chamber.

The hot combustion gases being produced from the respective gas burner means are at a temperature substantially hotter than that of the spent fluid. As the spent hot working fluid is drawn into the respective mixing chambers, a mixing effect will occur between the spent fluid and the newly produced hot combustion gases. As can be seen in FIG. 3, the mixture means comprises a plurality of apertures, such as apertures 90–95, integrally formed through each of the gas burner means, such as burner means 16 and 18, coupled with the substantially parallel flow of the spent hot working fluid, relative to the longitudinal axis of the respective gas burner means, as it enters into the mixing chamber. Accordingly, since the newly produced hot combustion gases are being released through apertures, such as apertures 90–95, in a direction substantially perpendicular to the longitudinal axis of the gas burner means, the spent hot working fluid being sucked into the mixing chamber will, in effect, collide with the newly released hot working fluid, to, in turn, result in a mixing of spent fluid and newly produced hot combustion gases.

First and second temperature adjusting means 33 and 34, respectively, are shown in FIG. 3 as comprising thermocouples—although any other type of conventional mechanism for altering the temperature of the hot air to be produced, or after it is produced, from a corresponding one of the gas burner means, is also contemplated for use. As will be explained, each of the temperature adjusting means independently controls the temperature of the hot combustion gases being produced from a dedicated one set of gas burner means. Plus associated mixing means.

First and second impingement velocity control means are shown in FIG. 3, in which impingement velocity of the hot combustion gases being distributed toward and into the top and bottom surfaces of the glass sheet is independently controlled by adjusting the speed of the shaft of fans, such as shafts of fans 45 and 52. Such controls enable the impingement velocity of the hot combustion gases being directed toward and into contact with the top surface of the glass sheet to be adjusted independently, and, in turn, at a different velocity than the hot combustion gases being directed toward and into the bottom surface of the glass sheet—if so desired. Independent velocity adjustment between adjacent zones along the glass path on the top section and bottom section is achieved in a similar manner.

In operation, glass sheet 100 is inserted within interior region 42 of housing 12 through a glass sheet insertion inlet (not shown), and, transfer of the glass sheet through the interior region of the housing is accomplished by conveying means 14. Although the conveying means may comprise ceramic rollers, other types of rollers or other conventional conveying mechanisms are also contemplated for use.

As glass sheet 100 is being conveyed through housing 12, top surface 101 will be operably exposed adjacent a portion of second distributing means 22, and more particularly, adjacent the array of nozzles in working fluid conduit 53 (as shown in FIG. 5). Accordingly, bottom surface 102 of glass sheet 100 will be operably positioned adjacent a portion of first distributing means 20, and more particularly, adjacent the array of nozzles 50 of working fluid conduit 46. As can be seen in FIG. 2 and FIG. 5, each of the nozzles 50 of combustion air conduit 46, of first distributing means 20, are operably positioned between the individual rollers of conveying means 14. Such an orientation facilitates relatively unobstructed impingement of the hot working fluid toward and onto bottom surface 102 of glass sheet 100.

In addition, as glass sheet 100 is being conveyed through housing 12, each set of gas burner means and mixing means will be producing hot combustion gases at a desired temperature. Since the sheet of glass to be heated may be of a type different than that of a sheet of glass previously heated in apparatus 10 (e.g., different glass colors, surface treatments and/or thicknesses, among other variables), it is important to note that the temperature of the hot combustion gases being produced from each set of respective gas burner means and mixing means, as well as the impingement velocity of same, can be controlled independently of each other (by corresponding temperature adjusting means and impingement velocity control means) to, in turn, enable independent control of convective heat transfer to the top and bottom surfaces 101 and 102, respectively, of the specific glass sheet 100 being heated. Indeed, such independent controlling of temperature and/or velocity enables different types of glass sheets to be processed at a substantially constant rate within apparatus 10—without the necessity of altering the speed at which the glass is conveyed through the apparatus.

As the hot combustion gases are being produced from the gas burner means, they will mix with the recirculating spent working fluid, and then will flow in the direction of the arrows, as shown in FIG. 3. As previously explained, such a flow pattern will occur as a result of corresponding fans 45 and 52, respectively, drawing the hot working fluid toward and into respective ones of working fluid conduits 46 and 53 of first and second distributing means 20 and 22, respectively. The hot combustion gases will then continue to travel through the respective working fluid conduits until it is released through corresponding nozzles, such as nozzles 50 and 56, where the hot working fluid will then impinge upon the adjacently positioned top and bottom surfaces 101 and 102, respectively, of glass sheet 100—toward operable heating of same.

After the newly produced hot combustion gases has impinged the glass sheet, the fluid that has impinged top surface 101 of glass sheet 100 will, in effect, bounce there off, and this spent hot working fluid will then be drawn into second mixing chamber 28. Similarly, the newly produced hot combustion gases that have impinged bottom surface 102 of glass sheet 100, will also bounce there off and, in turn, be drawn into first mixing chamber 26—as shown by the direction of the arrows in FIG. 3 and FIG. 5.

As previously explained, the spent hot working fluid is drawn into the respective mixing chambers because of suction caused by the corresponding fans, such as fan 45, and the relatively hot temperature of the newly produced hot combustion gases from the associated gas burner means, such as gas burner means 16. As also previously explained, the spent hot working fluid and the newly produced hot combustion gases mix within the respective mixing chambers, to, in turn, result in a substantially uniform mixture of the fluids for further, recirculated, distribution of the mixed fluids to the respective top and bottom surfaces of the glass sheet.

The description and drawings merely explain and illustrate the invention and the invention is not limited thereto except as far as the appended claims are so limited as those skilled in the art who have the disclosure before they can make modifications and variations therein without departing from the scope of the invention.

What is claimed is:

1. A process for heating a sheet of glass in a forced convection heating apparatus, wherein the apparatus includes a housing having an interior region and the glass sheet has a top and bottom surface, the process comprising the steps of:

inserting a glass sheet into the interior region of the housing;

supporting the glass sheet in a substantially horizontal manner with at least one solid support member;

producing hot combustion gases from at least one gas burner;

distributing the hot combustion gases from the at least one gas burner toward and into operable contact with at least one of the top and bottom surfaces of the glass sheet within the interior region of the housing;

sucking at least a portion of spent hot working fluid which has operably contacted the at least one of the top and bottom surfaces of the glass sheet toward and into a mixing chamber operably associated with a corresponding one of the at least one gas burner;

each of the mixing chambers being operably positioned about at least a portion of the corresponding one of the gas burners;

mixing the spent hot working fluid in the mixing chamber with the hot combustion gases being produced from the corresponding one of the at least one gas burner; and distributing the mixed spent hot working fluid and the newly produced hot combustion gases toward and into operable contact with the at least one of the top and bottom surfaces of the glass sheet.

2. The invention according to claim 1 wherein the process for heating a sheet of glass in a forced convection heating apparatus further comprises the step of controlling impingement velocity of the mixed spent hot working fluid and newly produced hot combustion gases from the mixing chamber toward and into contact with at least one of the top and bottom surfaces of the glass sheet.

3. The process according to claim 1 wherein the process for heating a sheet of glass in a forced convection heating apparatus further comprises the steps of:

controlling impingement velocity of the mixed spent hot working fluid and newly produced hot combustion gases from the mixing chamber toward and into contact with the top surface of the glass sheet; and controlling impingement velocity of the mixed spent hot working fluid and newly produced hot combustion gases from the mixing chamber toward and into contact with the bottom surface of the glass sheet, the controlling of the impingement velocity of the mixed fluids toward and into contact with the top and bottom surfaces, respectively, of the glass sheet, being controllable independently of each other.

4. The process according to claim 1 wherein the process for heating a sheet of glass in a forced convection heating apparatus further comprises the step of adjusting the temperature of the mixed spent hot working fluid and newly produced hot combustion gases prior to operable contact of same with at least one of the top and bottom surfaces of the glass sheet.

5. The process according to claim 1 wherein the process for heating a sheet of glass in a forced convection heating apparatus further comprises the steps of:

adjusting the temperature of the mixed spent hot working fluid and newly produced hot combustion gases from the mixing chamber which is to come into contact with the bottom surface of the glass sheet; and adjusting the temperature of the mixed spent hot working fluid and newly produced hot combustion gases from the mixing chamber which is to come into contact with the top surface of the glass sheet, the adjusting of the temperature of the mixed fluids which are to come into contact with the top and bottom surfaces, respectively, of the glass sheet, being adjustable independently of each other.

6. A process for heating a glass sheet in a forced convection heating apparatus wherein the apparatus includes a housing having an interior region and the glass sheet has a top and a bottom surface, the process comprising the steps of:

inserting a glass sheet within the interior region of the housing;

supporting the glass sheet in a substantially horizontal manner with at least one solid support member;

producing hot combustion gases from a first gas burner;

producing hot combustion gases from a second gas burner;

distributing the hot combustion gases from the first gas burner toward and into operable contact with the bottom surface of the glass sheet within the interior region of the housing;

distributing the hot combustion gases from the second gas burner toward and into operable contact with the top surface of the glass sheet within the interior region of the housing;

sucking at least a portion of spent hot working fluid which has operably contacted the bottom surface of the glass sheet toward and into a first mixing chamber;

the first mixing chamber being operably positioned about at least a portion of the first gas burner;

sucking at least a portion of spent hot working fluid which has operably contacted the top surface of the glass sheet toward and into a second mixing chamber;

the second mixing chamber being operably positioned about at least a portion of the second gas burner;

mixing the spent hot working fluid in the first mixing chamber with the hot combustion gases being produced from the first gas burner;

distributing the mixed spent hot working fluid and the newly produced hot combustion gases from the first mixing chamber toward and into operable contact with the bottom surface of the glass sheet;

mixing the spent hot working fluid in the second mixing chamber with the hot combustion gases being produced from the second gas burner; and distributing the mixed spent hot working fluid and the newly produced hot combustion gases from the second mixing chamber toward and into operable contact with the top surface of the glass sheet.

* * * * *